Oct. 7, 1924.

C. W. BAUMANN 1,511,072

AUTOMOBILE SNOW SHOVEL

Filed May 19, 1923

Inventor
C. W. Baumann
By A. Randulph Jr.
Attorney

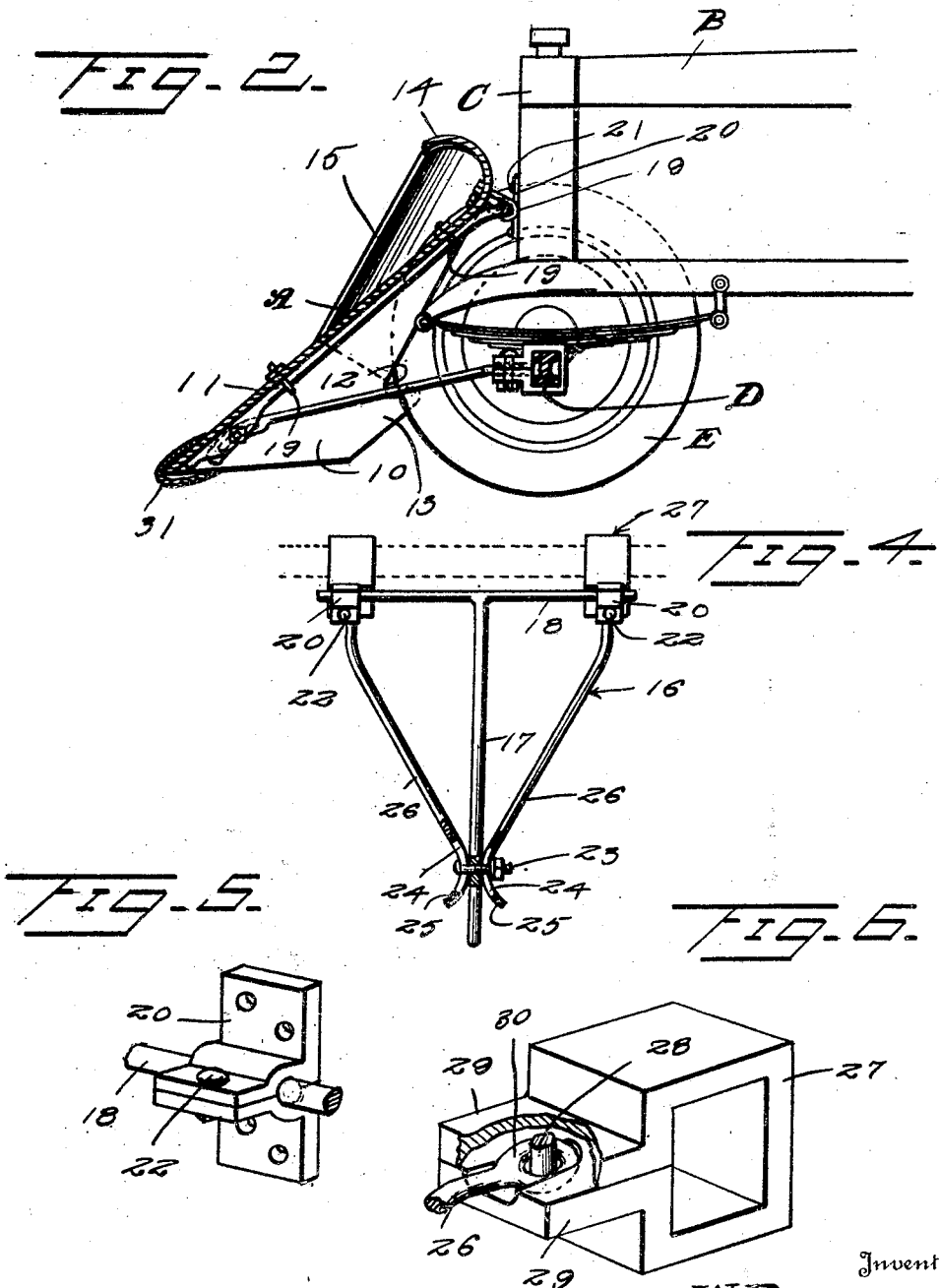

Patented Oct. 7, 1924.

1,511,072

UNITED STATES PATENT OFFICE.

CHRISTIAN W. BAUMANN, OF CAVALIER, NORTH DAKOTA.

AUTOMOBILE SNOW SHOVEL.

Application filed May 19, 1923. Serial No. 640,218.

*To all whom it may concern:*

Be it known that I, CHRISTIAN W. BAUMANN, a citizen of the United States, residing at Cavalier, in the county of Pembina and State of North Dakota, have invented certain new and useful Improvements in an Automobile Snow Shovel; and I do hereby declare the following to be a full, clear, and exact description of the invention, such as will enable others skilled in the art to which it appertains to make and use the same.

This invention relates to a snow shovel, designed as an attachment to an automobile, operable to remove snow from the path of travel of and in advance of the automobile.

An important object is to provide a construction which may be readily applied to or removed from an automobile or self-propelled vehicles and which has means to accommodate its attachment to different makes and sizes of automobiles or self-propelled vehicles.

Another object is to provide a novel construction of shovel which has means to deflect the snow to opposite sides of the vehicle and means to prevent passage of the snow over the shovel and on to automobile parts.

Another object is to provide a novel means of attachment consisting of adjustable elements for fastening to the front axle of an automobile, elements for fastening to a radiator of an automobile, a reinforcing frame for the shovel adapted for attachment to the said means attachable to said axle and the said radiator.

Additional objects and advantages will become apparent from a consideration of the description following taken in connection with accompanying drawings.

In said drawings:—

Figure 3 is a plan view of the shovel proper;

Figure 4 is a plan view of the attaching and reinforcing frame for the shovel;

Figure 5 is a perspective view of one of the radiator-engaging brackets, and

Figure 6 is a perspective view of one of the axle engaging brackets and rods.

Like reference characters designate like or similar parts in the different views.

Figure 1:
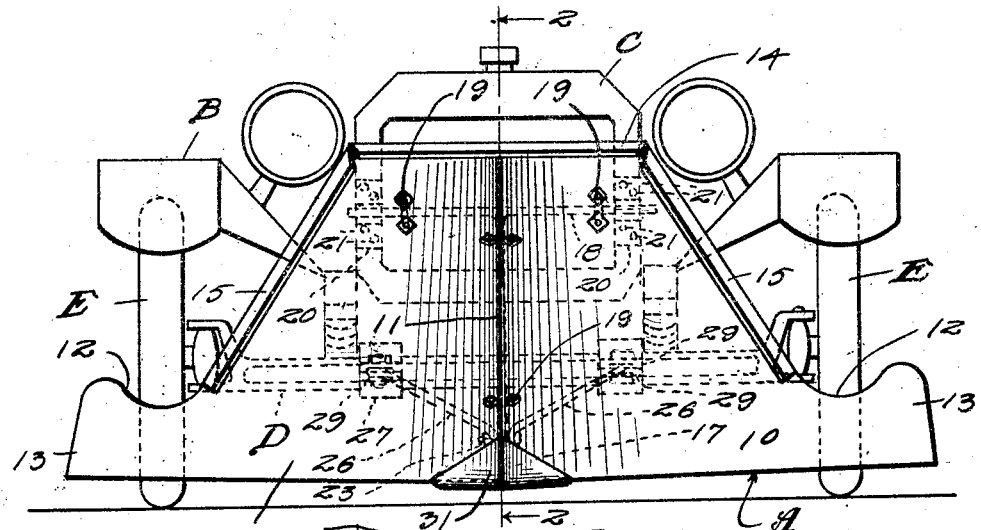
Figure 1 is a perspective view of the forward end of an automobile showing the improved snow shovel in place.
Figure 2:
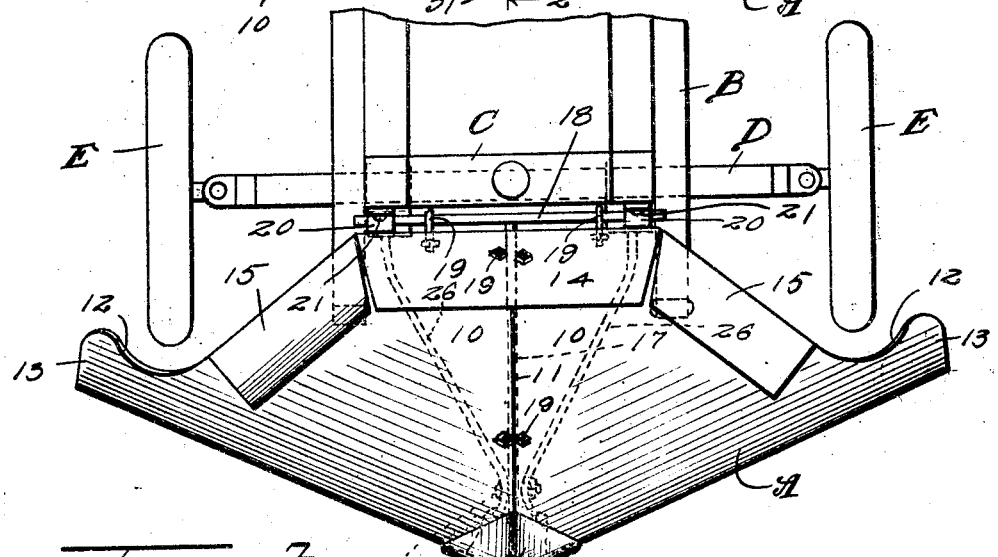
Figure 2 is a similar view with the shovel proper removed so as to show the attaching means for the shovel.

In reducing the invention to practice, a shovel, preferably made from a single sheet of metal is provided as at A. To facilitate an understanding of the function and mounting of said shovel, an automobile or other self propelled vehicle has been fragmentarily and conventionally shown as at B of which the radiator is designated C, front axle D and the front wheels E.

Said shovel has wings 10 which are laterally and rearwardly inclined from the longitudinal median line or ridge at 11. This shovel is adapted to be inclined or diagonally disposed as shown in the drawings and the wings 10 are recessed as at 12 so as to fit relatively close to the wheels and conform to the shape of the tires thereof. Said wings as at 13 extend outwardly beyond said wheels. The shovel at its rear end is provided with an upwardly and forwardly curved flange 14 and at its sides above the recesses 12 is provided with upwardly and inwardly curving flanges 15, preferably wider apart at their forward ends than at their rear ends. As the shovel advances into the snow, the snow is parted by the ridge 11, following the wings 10 and being deflected over the extensions 13 to the sides of the path of travel. Movement of the snow upwardly on the wings 10 is resisted by the flanges 14 and 15, which prevent the snow from rising and moving rearwardly on to the vehicle. The angularity of the flanges 15 further deflect the rearward passage of the snow over the shovels 10 since such angularity tends to compress the snow as it travels rearwardly. It will be understood that in actual practice, the lower edges of the shovel are disposed relatively close to the ground as shown in the drawings.

Any suitable means may be used to secure the shovel detachably to the automobile or self propelled vehicle. To this end, a frame may be utilized as at 16 which consists of a longitudinal and a transverse bar respectively designated 17 and 18, thus rendering the frame substantially T-shaped. This frame reinforces the shovel since the bar 17 is disposed under the ridge 11 and the bar 18 under the rear end of the shovel. The frame 16 may be rigidly attached to the shovel as by means of U-bolts at 19.

The U-bolts provide a detachable connection as will be realized. In order to fasten the bar 18 in place, a plurality of adjustable clamps 20 may be provided which are secured at 21 to the radiator C. These clamps may be loosened or tightened by adjustment of bolts at 22 in order to release or tighten the bar or rod 18. It will be realized that the clamps 21 may be secured to any radiator and that regardless of the distance between the clamps, due to the differences in sizes and types of radiators, the bar 18 will be accommodated.

Adjacent the lower end of the rod or bar 17, a removable bolt 23 may pass therethrough. The bolt may also pass through elongated slots 24 provided through arcuate terminals 25 of attaching rods or bars 26. Clamps 27 are adjustably applicable to the front axle B through the adjustment of bolts at 28. Bolts 28 pass through ears 29 on the clamp 27 and intermediate ears 29, eyelets 30 integral with the attaching rods 26 are interposed so that the bolt 28 also extends through said eyelets. By reason of the provision of bolt 23, the rod 17 and rod 26 may be moved relatively to each other for connection. In addition, the bolts 28 enable attachment of the rod 26 to automobiles of such construction that they have to be fastened at different distances apart, bolts 28 serving to fasten the rods 26 in place and the rods 26 rigid with relation thereto. Due to the arcuate terminals 25, regardless of the position of rods 26, said terminals will remain in effective contact with the rod 17.

At the junction of the wings 11 and disposed at the lower edge of the shoe 10 and brazed or otherwise fastened thereto is a suitable shoe 31. This shoe may be of any desired shape so as to avoid a sharp point, which in the event of the wheels E falling into a rut or hole will cause such point to penetrate the ground. With the shoe however, the sharp edge is avoided and the surface of the shoe will simply ride on the ground in the instance mentioned and thus prevent the shoe from penetrating or sticking in the ground or soil.

It will thus be seen that the attaching means enables the shovel to be connected to automobiles differing in sizes and shapes in a rigid and efficient manner.

As merely one practical embodiment has been illustrated and described, it is to be understood that changes in the details may be resorted to provided they fall within the spirit and scope of the invention.

I claim as my invention:—

1. A shovel attachment for vehicles consisting of a shovel, said shovel extending across the plane of movement of a wheel thereof, and said shovel being recessed to receive said wheel for compact disposition with respect to the vehicle.

2. A shovel attachment for vehicles consisting of a shovel, said shovel having wings disposed at an angle to each other, angularly disposed flanges at the sides of the wings, a flange at the rear ends of the wings, said flanges serving to resist passage of material across the rear end of the shovel, said wings being recessed adjacent the forward ends of the first mentioned flanges, to accommodate the wheels of the vehicle to enable compact disposition with respect to the vehicle, and said wings extending outwardly and laterally beyond said recesses.

3. A shovel attachment including a shovel, attaching bars for the shovel, one of said bars being secured to the shovel, and the other bars being secured at one of their ends to the first mentioned bar, the attaching ends of the last mentioned bars being arcuate and slotted to admit of adjustment thereof at varying angles to the first mentioned bar.

4. A shovel attachment consisting of a shovel, attaching bars for the shovel, means to secure said bars to a vehicle, and said bars having attaching portions engageable with the shovel, fastenings passing through slots in the bars and shovel, and one of the slots at each fastening being arcuate.

5. A shovel attachment consisting of a shovel, a substantially T-shaped reinforcing frame, means to secure one bar of said frame to a vehicle, attaching rods having terminals engageable with the other bar of the frame, said terminals being arcuate and provided with elongated slots, an adjustable fastening element passing through said slots and the second mentioned bar, and means to adjustably secure the attaching rods to the front axle of a vehicle.

6. A shovel attachment for vehicles consisting of a shovel having wings disposed at an angle to each other and inclining upwardly and rearwardly, a reinforcing and attaching frame having a bar disposed in contact with the wings at the under surface of the ridge, a transverse bar extending on opposite sides of the first mentioned bar, means to secure the transverse bar adjacent its ends to a vehicle, rods extending from said means forwardly and inwardly in contact with the under surface of the wings and connecting to the first mentioned bar adjacent its lower end, means associated with said frame disposed at an angle thereto and attachable to the vehicle below said transverse bar.

In testimony whereof I affix my signature in presence of two witnesses.

CHRISTIAN W. BAUMANN.

Witnesses:
 MILTON RYGH,
 S. J. SOEMSON.